United States Patent
Suda

(10) Patent No.: US 8,446,519 B2
(45) Date of Patent: May 21, 2013

(54) FOCUS CONTROL APPARATUS AND OPTICAL APPARATUS

(75) Inventor: Hirofumi Suda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 12/833,392

(22) Filed: Jul. 9, 2010

(65) Prior Publication Data

US 2010/0271510 A1 Oct. 28, 2010

Related U.S. Application Data

(62) Division of application No. 11/153,526, filed on Jun. 15, 2005, now Pat. No. 7,773,146.

(30) Foreign Application Priority Data

Jun. 15, 2004 (JP) .................................. 2004-177183
Jun. 25, 2004 (JP) .................................. 2004-188429

(51) Int. Cl.
   *H04N 5/232* (2006.01)
(52) U.S. Cl.
   USPC ....................................................... 348/355

(58) Field of Classification Search
   USPC .................................. 348/345, 349, 353–355
   See application file for complete search history.

(56) References Cited

U.S. PATENT DOCUMENTS

| 4,967,280 | A | * | 10/1990 | Takuma et al. | 348/355 |
| 5,534,923 | A | * | 7/1996 | Suda | 348/354 |
| 5,692,118 | A | * | 11/1997 | Yasukawa | 396/153 |
| 5,896,174 | A | * | 4/1999 | Nakata | 348/348 |
| 7,499,096 | B2 | * | 3/2009 | Yamazaki | 348/348 |
| 2004/0057712 | A1 | * | 3/2004 | Sato et al. | 396/89 |

\* cited by examiner

*Primary Examiner* — Chieh M Fan
*Assistant Examiner* — Ahmed A Berhan
(74) *Attorney, Agent, or Firm* — Cowan, Liebowitz & Latman, P.C.

(57) ABSTRACT

A focus control apparatus includes a signal generator for generating a first signal in accordance with a predetermined frequency component of an image signal obtained by photoelectrically converting an image of a subject formed by an image-taking optical system, a detector for detecting a second signal different from the first signal, and a controller for detecting a movement of the subject based on the second signal and for switching driving of the image-taking optical system based on the detection, wherein the controller controls driving of the image-taking optical system based on the first signal.

5 Claims, 14 Drawing Sheets

FOCUS CONTROL APPARATUS AND OPTICAL APPARATUS

CROSS-REFERENCE TO RELATED APPLICATIONS

This application is a divisional of application Ser. No. 11/153,526, filed Jun. 15, 2005 now U.S. Pat. No. 7,773,146 the entire disclosure of which is hereby incorporated by reference.

BACKGROUND OF THE INVENTION

The present invention relates a focus control apparatus to be mounted in an optical apparatus, such as a camera.

A contrast autofocus ("AF") system among the AF control for use with a camera, etc. uses an image-pickup device for an image-taking optical system, and detects a high frequency component in a brightness signal obtained from the image-pickup device or a component of the contrast state (visibility) (referred to as an "AF evaluation value" hereinafter). The contrast AF system thereby provides highly precise, small and inexpensive AF control since no focal-point detecting system is required.

Known as the contrast AF system are a full scan system that scans from infinity to a close-up end, detects an AF evaluation value, and moves a lens to a (focal) position corresponding to the maximum AF evaluation value, and a contrast detection system that moves a lens by a predetermined amount in a direction for increasing the AF evaluation value, and for detecting the maximum AF evaluation value (or a peak).

Other known AF systems include a phase-difference detecting AF system and a triangulation AF system, each of which uses a sensor different from an image-pickup device in the image-taking optical system to form a dedicated detection system. Problematically, these focus control systems have focal point detection accuracy lower than the contrast AF system because they use a dedicated detecting system subject to time and temperature variations, and cause a parallax between a subject and a distance-measuring position depending upon the distance.

These phase-difference detecting AF system and triangulation AF system calculate a driving amount of a lens up to a focal position based on the detected phase difference and distance. They do not require scanning or peak detections by actually driving a lens in detecting a focal position as in the contrast AF system, and have an advantage in a fast focal-point detecting speed.

Japanese Patent Application, Publication No. 2001-255456 discloses a hybrid AF control system that combines the contrast AF system with the triangulation AF system (or phase-difference detecting AF system) so as to take advantage of these systems.

For example, the hybrid AF system selects the contrast AF system for a static or stationary subject that does not change a distance, and the triangulation AF system for a dynamic or moving subject that changes the distance, attempting to detect a focal point for both the dynamic and static subjects.

However, the hybrid AF proposed in Japanese Patent Application, Publication No. 2001-255456 completely switches the AF system and has a problem in that it cannot maintain the sufficient focal-point detecting accuracy for a distance-changing subject. In other words, while the contrast AF system can maintain the sufficient accuracy for a stationary subject, the triangulation AF system exclusively used for a dynamic or distance-changing subject is greatly subject to an erroneous measurement of a focal position due to the time and temperature variations, and causes a high pixel density image-pickup device an out-of-focus state, for example.

Japanese Patent Application, Publication No. 2001-264622 also discloses the hybrid AF system that switches focus control between an outer-measuring triangulation AF system (or passive AF system) and a TTL contrast AF system in accordance with an operation of an image-taking switch. It detects a focal point with both AF systems and provides such control as selects one of the systems based on two focal-position measurement results.

Japanese Patent Application, Publication No. 2001-141984 discloses a hybrid AF system that switches focus control to the contrast AF system after driving a lens to a front-pin or back-pin position by a predetermined amount away from a focal point detected by the outer-measuring triangulation AF system (active AF system). This system returns to the triangulation AF system if it cannot detect the contrast after switching.

Japanese Patent Application, Publication No. 3-81713 discloses focus control that identifies a focal position direction and controls a focus driving speed using the triangulation AF system, and switches to the contrast AF system when it detects the AF evaluation value.

However, the hybrid AF system disclosed in Japanese Patent Application, Publication No. 2001-141984 causes two AF systems to detect focal points for different subjects, for example, due to the parallax. When the contrast AF system cannot sufficiently detect a focal point after the triangulation AF system detects the focal point, the mode is again switched to the triangulation AF system and the focal position is possibly unavailable due to the temporary hunting.

In addition, the hybrid AF system disclosed in Japanese Patent Application, Publication No. 3-81713 uniformly switches two AF systems based only on the AF evaluation value that is greatly variable depending upon a subject. A switching position is sometimes far from a focal position and sometimes close to it in the AF system, resulting in an unstable focus control.

BRIEF SUMMARY OF THE INVENTION

One of exemplary objects of the present invention is to provide a focus control apparatus that provides highly precise focus control even to a moving subject, and an optical apparatus having the focus control apparatus.

Another exemplary object of the present invention is to provide a focus control apparatus that smoothly and quickly switches the AF systems in the hybrid AF system.

A focus control apparatus according to one aspect of the present invention includes a signal generator for generating a first signal in accordance with a predetermined frequency component of an image signal obtained by photoelectrically converting an image of a subject formed by an image-taking optical system, a detector for detecting a second signal different from the first signal, and a controller for detecting a movement of the subject based on the second signal and for switching driving of the image-taking optical system based on the detection, wherein the controller controls driving of the image-taking optical system based on the first signal.

A focus control apparatus according to another aspect of the present invention includes a signal generator for generating a first signal that corresponds to a predetermined frequency component in an image signal obtained by photoelectrically converting an image of a subject formed by an image-taking optical system, a detector for detecting a second signal different from the first signal, and a controller for switching driving of the image-taking optical system based on the second signal when the subject moves, wherein the controller controls driving of the image-taking optical system based on the first signal.

A focus control apparatus according to another aspect of the present invention includes a first signal generator for generating a first signal that corresponds to a predetermined frequency component in an image signal obtained by photoelectrically converting an image of a subject formed by an image-taking optical system, a detector for detecting a second signal different from the first signal, a controller for providing the image-taking optical system with first control based on a first signal and second control based on a second signal, and a second signal generator for generating a third signal that corresponds to a frequency component in the image signal, or a change of a changing amount of a first signal, or a ratio between plural different frequency components in the image signal, or a normalized second signal, wherein the controller selects one of the first and second control based on the third signal.

An optical apparatus according to still another aspect of the present invention includes an image-pickup unit for photoelectrically converting an image of a subject formed by an image-taking optical system, a recording circuit for recording an image signal in a recording medium, which image signal is obtained by using the image-taking unit, and the above focus control apparatus.

Other objects and further features of the present invention will become readily apparent from the following description of the embodiments with reference to accompanying drawings.

DETAILED DESCRIPTION OF THE PREFERRED EMBODIMENTS

Referring now to the accompanying drawings, a description will be given of preferred embodiments of the present invention.

First Embodiment

Figure 1:
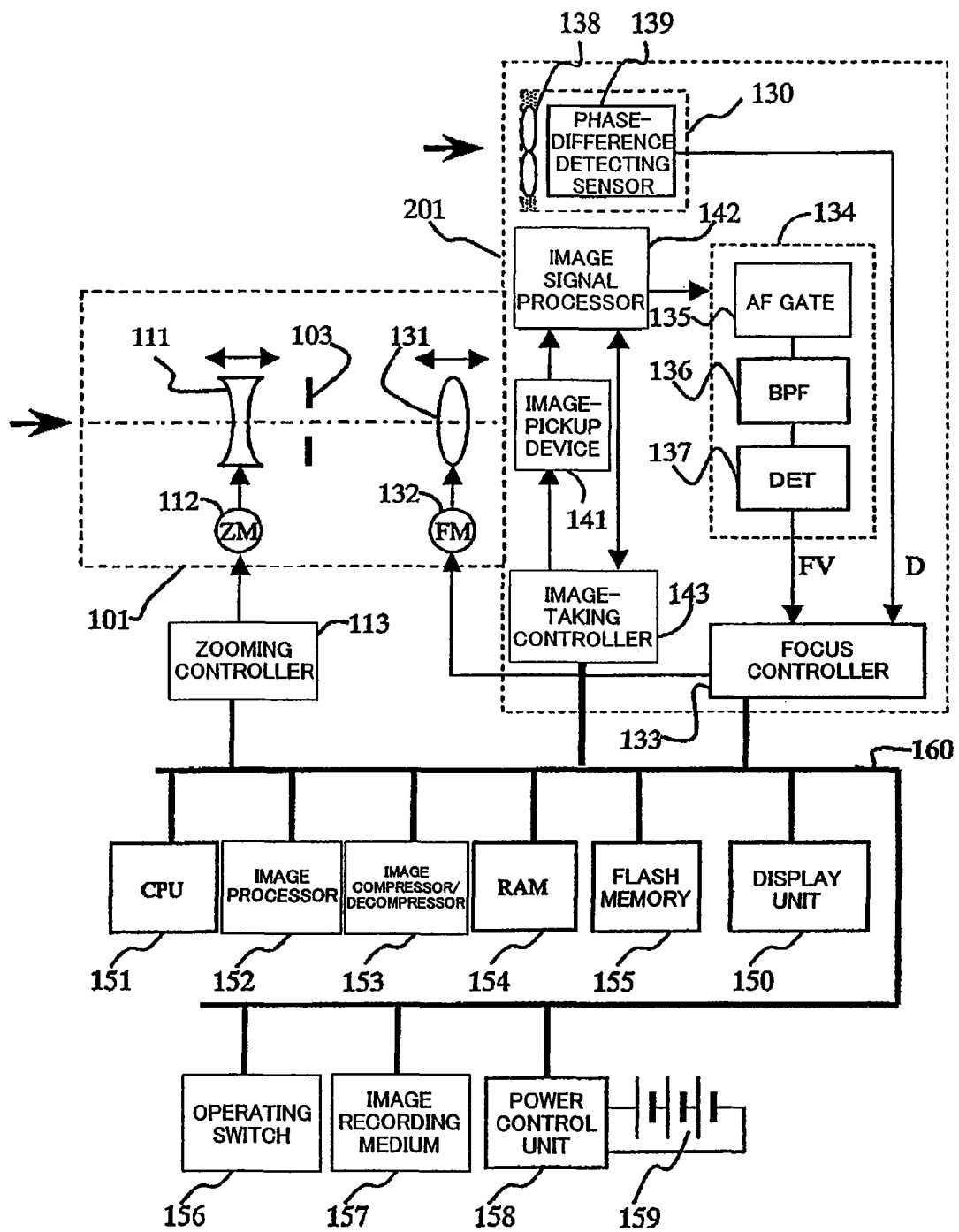
FIG. 1 is a structural block diagram of an optical apparatus according to a first embodiment of the present invention.

FIG. 1 is a schematic block diagram of a camera system according to a first embodiment of the present invention, including a camera body 201 and a lens unit 101 mounted on the camera body 201. While this embodiment shows a lens interchangeable camera system in which the lens unit 101 is attached to and detached from the camera body 201, the present invention is also applicable to a lens fixed camera system. While this embodiment discusses a digital still camera, the present invention is also applicable a video camera system. Each of the camera system, camera body and interchangeable lens are included in the inventive optical apparatus.

The lens unit 101 includes a zoom lens 111 that moves in an optical-axis direction and varies a focal length of a projection optical system, a focus lens 131 that moves in the optical-axis direction for focusing, and a light intensity adjusting member (or stop) 103 that adjusts the incident light intensity upon the image surface in accordance with the brightness of the subject. Each lens includes plural members although they are not illustrated, and the image-taking optical system may include a fixed lens, etc. The zoom lens 111 is driven by a zoom motor 112 via a zoom controller 113, and the focus lens 131 is driven by a focus motor 132 via a focus controller 133.

In the camera body 201, 141 is an image-pickup device, such as a CCD sensor and a CMOS sensor, and a subject image is formed by the image-taking optical system on a light-receiving surface of the image-pickup device 141. An image signal processor 142 controlled by the image-taking controller 143 generates an image signal (or a shot image signal) based on an output signal from the image-pickup device 141.

134 is an AF signal processor that serves as a signal generator, and extracts only a predetermined high-frequency component using a band-pass filter ("BPF") 136, from an image signal obtained by one or more AF gates 135. A detector ("DET") 137 provides a detection process, such as a peak hold and integration, generates and outputs to the focus controller 133 an AF evaluation value signal FV that serves as a first signal. When there are plural AF gates 135, BPFs 136, and DETs 137, plural AF evaluation value signals FV are produced and the focus controller 133 provides focus control, for example, by selecting one of the AF evaluation value signals FV in accordance with one condition, or based on these plural AF evaluation value signals FV.

On the other hand, the distance-measuring unit 130 that serves as a distance-measuring detector photoelectrically converts a pair of subject images (two images) formed on the phase-difference detecting sensor 139 through the distance-measuring pupil dividing optical system 138, and detects a phase-difference amount between the two images. The distance-measuring unit 130 calculates and outputs to the focus controller 133 a distance signal D indicative of a distance to the subject based on the phase-difference amount.

The image signal shaped in the image signal processor 142 is temporarily stored in a RAM 154. The image signal stored in the RAM 154 undergoes a compression process in an image compressor/decompressor 153, and recorded in an image recording medium 157 such as a semiconductor memory, an optical disc, and a magnetic tape. In parallel, the image signal stored in the RAM 154 is turned into an optimal size through a reduction/enlargement process in an image processor 152, and displayed on a display unit 150, thereby enabling a photographer to observe the subject image on a real-time basis. Just after shooting, the display unit 150 displays the shot image for a predetermined time period, enabling the photographer to confirm it.

156 denotes an operating switch including a power switch, a zoom switch, a release switch, a monitor display on/off switch, etc. The power switch powers on and off the camera, and the zoom switch directs zooming. The release switch allows for two stroke operations, i.e., a half-press operation and a full-press operation. When a first stroke switch SW1 turns on, a CPU 151 starts a reset action from the photography standby and a photography preparation action, such as an AF and photometry. When a second stroke switch SW2 turns on, the CPU 151 starts a photographing action and directs the image recording medium 157 to record the image, etc. The monitor display on/off switch directs switching between a display state and a non-display state of an image on the display unit 150.

A power control unit 158 provides power control, such as a status check of a battery 159 connected to it and charge of the battery 159.

Prior to these operations, when the camera body 201 is powered on (or turned from an off state to an on state), a program stored in a flash memory 155 is loaded in the RAM 154 and the CPU 151 starts processing in accordance with the loaded program in the RAM 154. Each unit and circuit in the camera body 201 is connected to each other via a bus 160, and controlled by the CPU 151.

While the CPU 151 in the camera body 201 controls the AF signal control processor 134 and the focus controller 133 for the AF process in this embodiment, the lens unit 101 may include a lens CPU, an AF signal controller, and a focus controller etc. and provide AF by receiving the image signal from the image signal processor 142 in the camera body 201.

Figure 4:
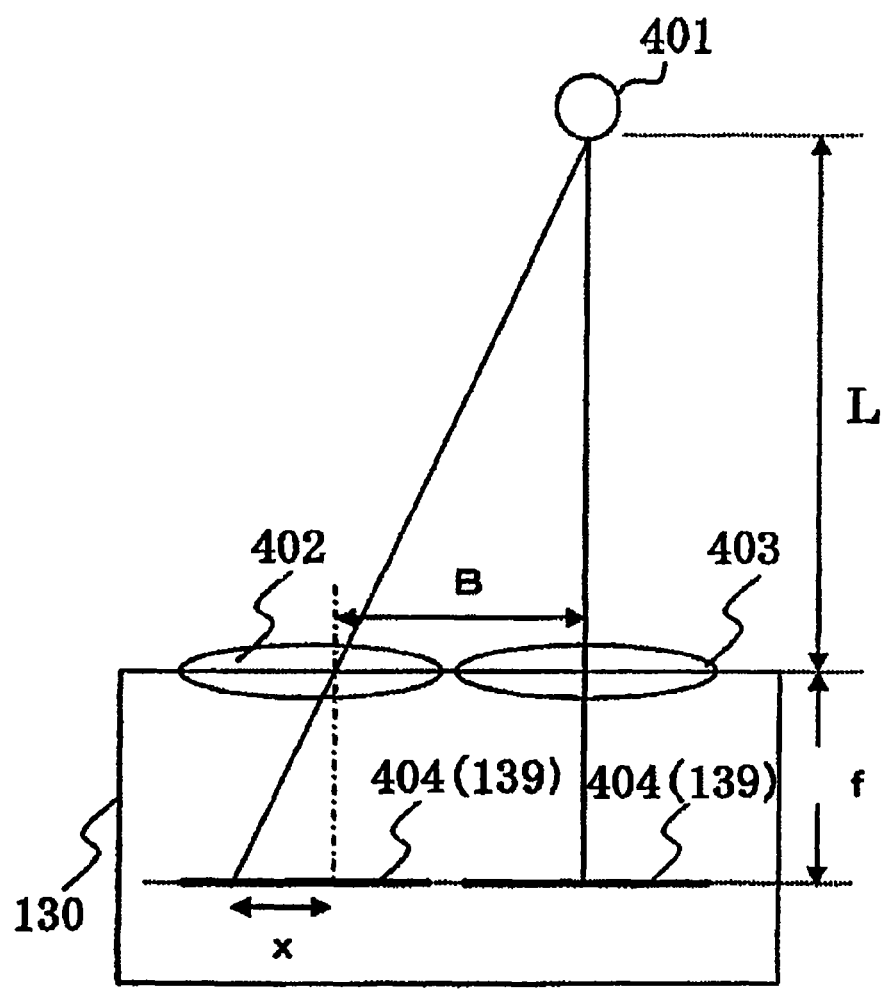
FIG. 4 shows an operational principle of the distance-measuring AF according to the first embodiment of the present invention.

Referring now to FIG. 4, a description will be given of an operational principle of the distance-measuring unit 130 of this embodiment.

401 denotes a subject. 404 and 405 denote respectively sensor arrays (referred to as "line sensors" hereinafter) L and R in which the photoelectric conversion sensors are arranged. These components constitute the phase-difference detecting sensor 139. The line sensor L 404 and the line sensor R 405 include AF sensor lens L 402 and AF sensor lens R 403, respectively. The light from the subject 401 passes the optical path, and is detected on the line sensors L404 and R405. These AF sensor lenses L402 and R403 and line sensors L404 and R405 constitute the distance-measuring unit 130 that provides outer-measuring triangulation.

A distance L from the distance-measuring unit 130 to the subject 401 is given by L=B×f/x, where B is a baseline length of the distance-measuring unit 130, f is a focal length, and x is a phase difference based on the line sensor R405. Based on this result, a driving amount of the focus lens 131 to the focal position is calculated using a function with the distance L or phase difference x obtained from the above equation. The calculated distance L is input as the distance signal D into the focus controller 133.

While this embodiment discusses a passive distance-measuring AF system, an alternative embodiment uses an infrared distance-measuring system that calculates a distance to the subject using the triangulation principle by receiving the infrared light projected upon the subject.

Figure 2:
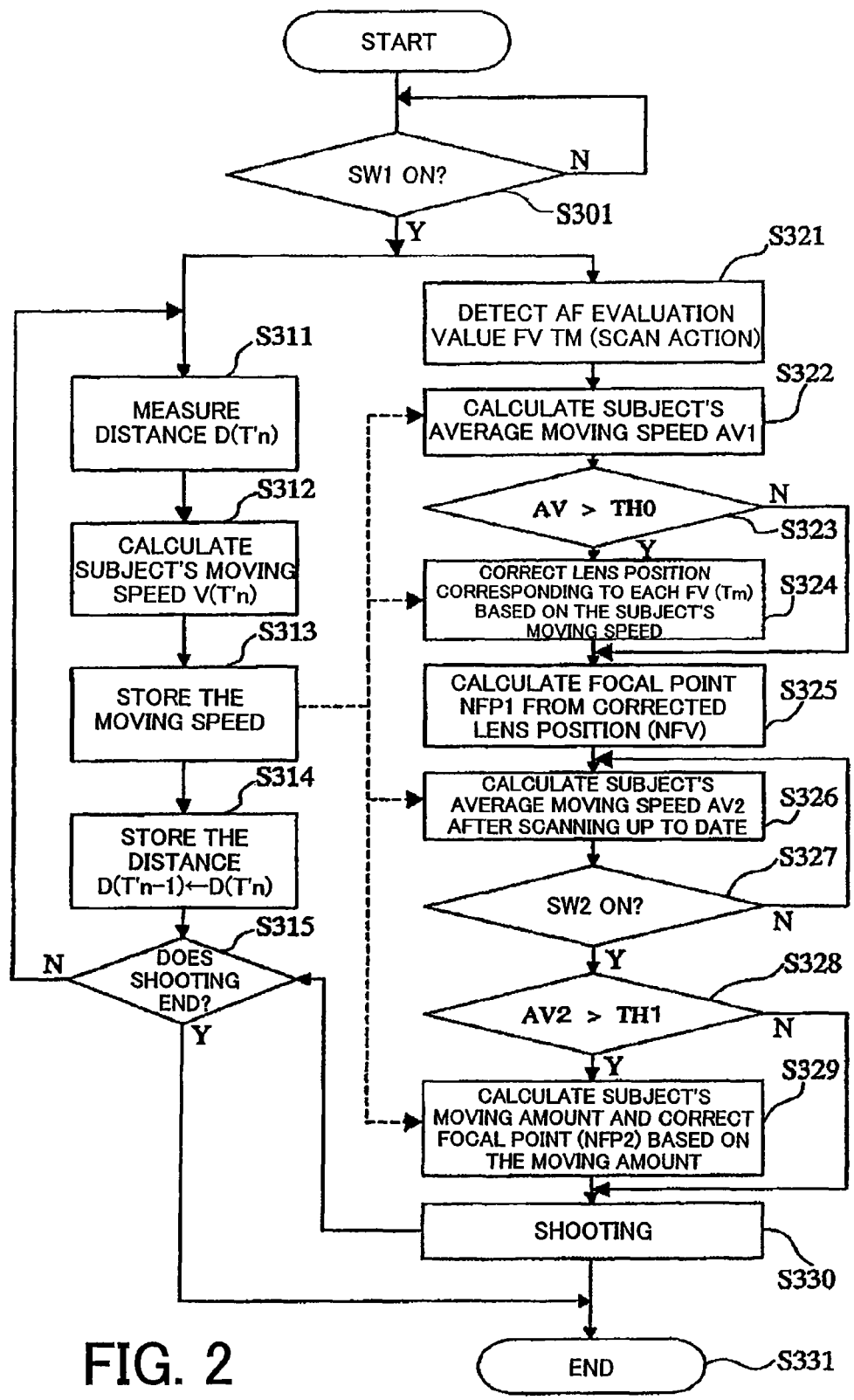
FIG. 2 shows a process flow according to the first embodiment of the present invention.

This embodiment provides focus control based on the distance signal D and the AF evaluation value signal FV, and AF is provided by driving the focus lens 131 via the focus motor 132. FIG. 2 is a process flow, and FIG. 3 shows a transition during the process of this embodiment.

First, the status is transferred to a photographing state and whether the first stroke switch SW1 is turned on is detected. When the first stroke switch SW1 is turned on, the focus control process starts (S301). In this embodiment, steps 311 to 314 detect a distance to the subject and calculate the subject's moving speed, and steps 321 to 329 simultaneously detect a focal point using the contrast AF process.

Figure 3A:
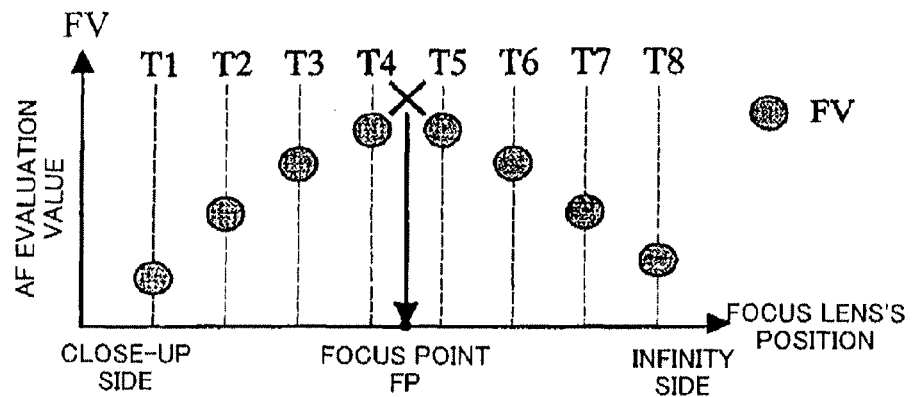
FIG. 3 shows a transition during the process according to the first embodiment of the present invention.

The contrast AF process obtains the AF evaluation value signal (simply referred to as "AF evaluation value" hereinafter) FV by moving a position of the focus lens 131 at regular intervals from the close-up side to the infinity side from time T1 to time T8, as shown in FIG. 3A. When it is determined from a detected path (or curve) of the AF evaluation value FV that a peak position exists, for example, between T4 and T5, a focal point or position FP is calculated by interpolating the AF evaluation value FV between T4 and T5.

In the distance-measuring process, a distance signal D(T'n) is measured at time T'n (S311), and a subject's moving speed is calculated from the distance to the subject and a detection time period (S312). This calculation is based on the following equation:

$$V(T'n)=(D(T'n)-D(T'n-1))/(T'n-T'n-1)$$

Thereby, the subject's moving speed V(T'n) is calculated and stored in the RAM 154 (S313). The distance to the subject (which is a value by substituting D(T'n) for D(T'n−1)) is also stored (S314).

The flow from step 311 to step 314 is repeated until the photographing action ends, and the distance to the subject and the subject's moving speed are sequentially detected and operated during the focus control. The subject's moving speed at each time during operations of steps 321 to 329, which will be described later, is continuously detected and the subject's moving speed at each time is stored in the RAM 154.

A detailed description will now be given of the contrast AF process in steps 321 to 329.

This embodiment executes a scan action for measuring the AV evaluation value FV at time Tn (n=1, ... k) while moving the focus lens by a predetermined fine driving amount (S321). FIG. 3A shows a detected path of the AF evaluation values FV while the focus lens 131's lens position is moved from the close-up side to the infinity side at regular intervals from time T1 to time T8.

After the scan operation of the AF evaluation value FV, the subject's moving speed V is obtained at each of time T1 to T8 from the RAM 154 and the subject's average moving speed AV is calculated in the scan operation. The subject's average moving speed AV is calculated by dividing the moving speed V(Tn) at each time Tn by the number of measurements from time T1 to time T8 or as follows (S322):

$$AV=(V1+V2+V3+V4+V5+V6+V7+V8)/8$$

Then, the subject's average moving speed AV is compared with a predetermined threshold TH0 (S323). When the subject's average moving speed AV is smaller than the threshold TH0 or the subject moves fast, the focal point FP (or focus lens's position) is corrected based on this moving speed (S324).

Step 324 calculates a moving amount of the subject during a time difference between the reference time to each point of measuring time, and corrects a lens position corresponding to each point of the AF evaluation value FV(Tm).

Figure 3B:
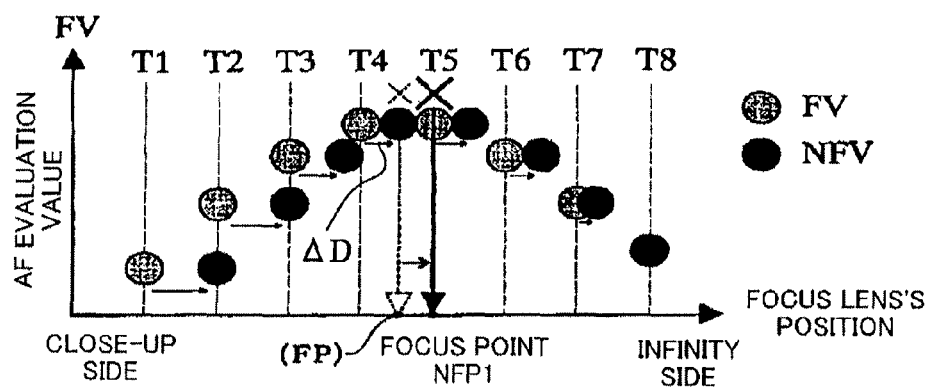

More specifically, as shown in FIG. 3B, when the correction is based on time T8, the moving amount of the lens position for each time T1 to T8 is calculated based on differences between time T8 and each time T1 to T7 at which the AF evaluation values FV is detected and the subject's average moving speed for each time interval. The moving amount is converted into a moving amount of the focus lens 131.

For example, a moving amount ΔD corresponding to the AF evaluation value FV at time T4 is calculated as ΔD(T4) =average moving speed (D(T5)+D(T4)/2)×time interval (T8−T4). Thus, each moving amount ΔDn is added to the lens position corresponding to each AF evaluation value FV(Tm) detected in step 321 and the lens position is corrected at each time T1 to T7.

Step 325 interpolates the peak positions of the detected path based on the AF evaluation value NFV corresponding to the corrected lens position, calculates the focal point NFP, and corrects the focal point FP to the focal point NFP. A value of the AF evaluation value NFP itself is the same as the pre-corrected AF evaluation value FV, and does not change. It is the AF evaluation value corresponding to the lens position corrected by moving amount ΔD that corresponds to the AF evaluation value FV.

The above correction process may follow the entire scan operation from time T1 to time T8 so as to correct the focal point. Alternatively, a detection of the AF evaluation value FV and a correction of the lens position based on the subject's moving speed may alternate so as to calculate the detected path of the corrected AF evaluation value NFV: For example, the lens position at time T1 is corrected after the AF evaluation value FV(T2) at time T2 is detected, and the lens position at time T2 is corrected after the AF evaluation value FV(T3) at time T3 is detected.

On the other hand, when the subject's average moving speed AV is greater than the threshold TH0 or when the subject moves slowly, the subject is or is considered to be stationary. Then, without the above correction process, step 325 calculates the focal point FP based on the AF evaluation value FV detected in step 321.

When the subject moves after the scan operation up to now, the focal point moves further. Therefore, the subject's average moving speed AV2 is calculated after the scan operation starts and before the second stroke switch SW2 is turned on (S326).

When the second stroke switch SW2 is turned on (S327), it is determined whether the correction is needed in accordance with the subject's moving speed. In other words, when the subject's average moving speed AV2 is smaller than the threshold TH1, step 329 is omitted since no correction is determined necessary to the subject's moving speed and a photographing process follows (S330).

When the subject's average moving speed AV2 is greater than the threshold TH1 or when the subject moves fast and the correction is determined necessary to the focal point, step 329 corrects a focal point NFP1.

Figure 3C:
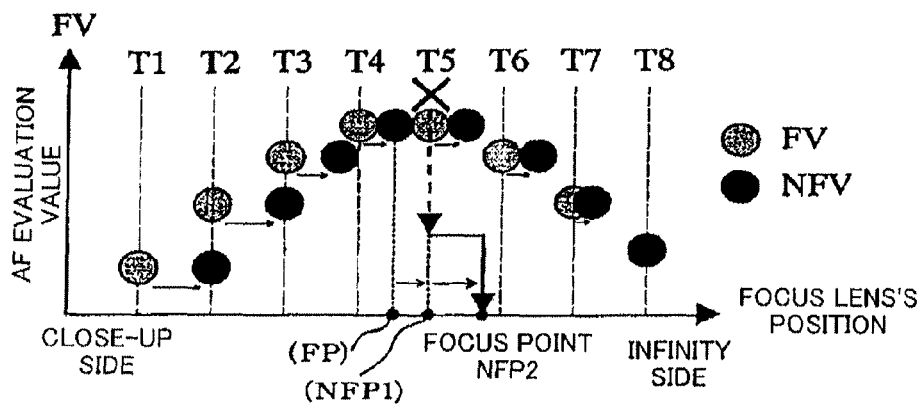

More specifically, as shown in FIG. 3C, a difference between the actual photographing time and the reference time (T8) used for step 322, and the subject's moving speed V, and the subject's moving amount of the subject based on that speed and during that period are calculated. The focal point is corrected from the focal point NFP1 to a focal point NFP2 based on the moving amount. The thresholds TH0 and TH1 may be the same value or interrelated independent values, and are values set for the optimal process in the camera system of this embodiment.

Finally, step 330 executes the photographing operation, outputs a signal indicative of a termination of photography (S315), and ends a series of AF operations.

Figure 9A:
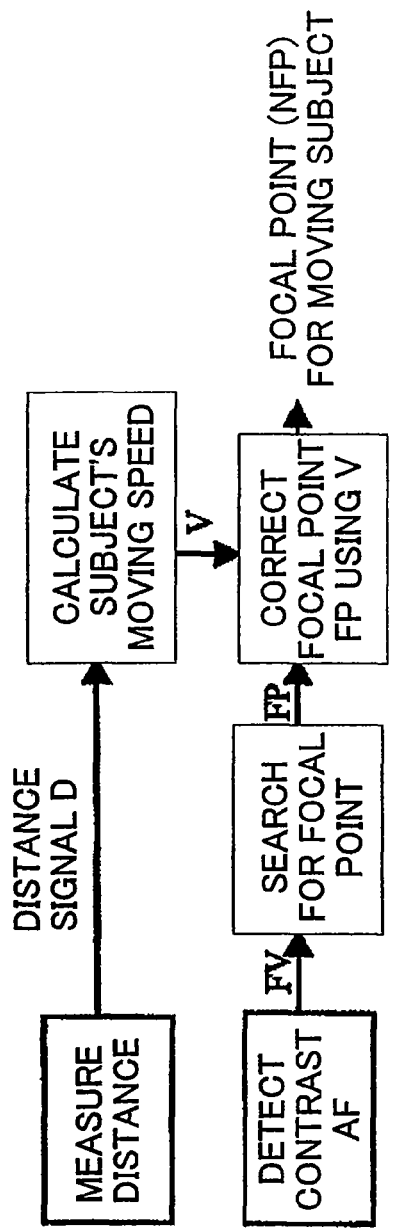
FIG. 9 is a conceptual view of a distance-measuring operation of this embodiment.

Thus, as shown in FIG. 9A, the distance-measuring unit 130 repeats a detection of the distance to the subject and a calculation of the subject's moving speed during the contrast AF process in this embodiment, and the focal point NFP of the moving subject is calculated by calculating or predicting a moving distance of the focal position after the predetermined time using the moving speed V and by correcting the focal point FP calculated as a result of focusing in accordance with the contrast AF system based on the AF evaluation value FV output from the AF signal processor 134.

In other words, the defocus due to the subject's movements is corrected since the lens position of the previously scanned AF evaluation value detecting position is corrected by predicting the movement based on the subject's movement detection, and since a focal position is corrected based on the moving speed during that period by measuring a time period to the actual photographing release time after focusing.

Thus, this embodiment realizes the optical apparatus that provides precise and quick focus control even over a moving subject using the contrast AF.

Since this embodiment detects the subject's moving speed by using the distance-measuring unit and utilizing a distance-measuring result as a relative value, a focal point is less affected by the time and temperature variations although the distance-measuring unit is likely to be affected by them.

Second Embodiment

FIGS. 5 to 8 show focus control in a camera system according to a second embodiment of the present invention. This embodiment provides contrast-detecting AF. The structure of the camera system in this embodiment is similar to that of the first embodiment, and similar components are designated by similar reference numerals.

Figure 7:
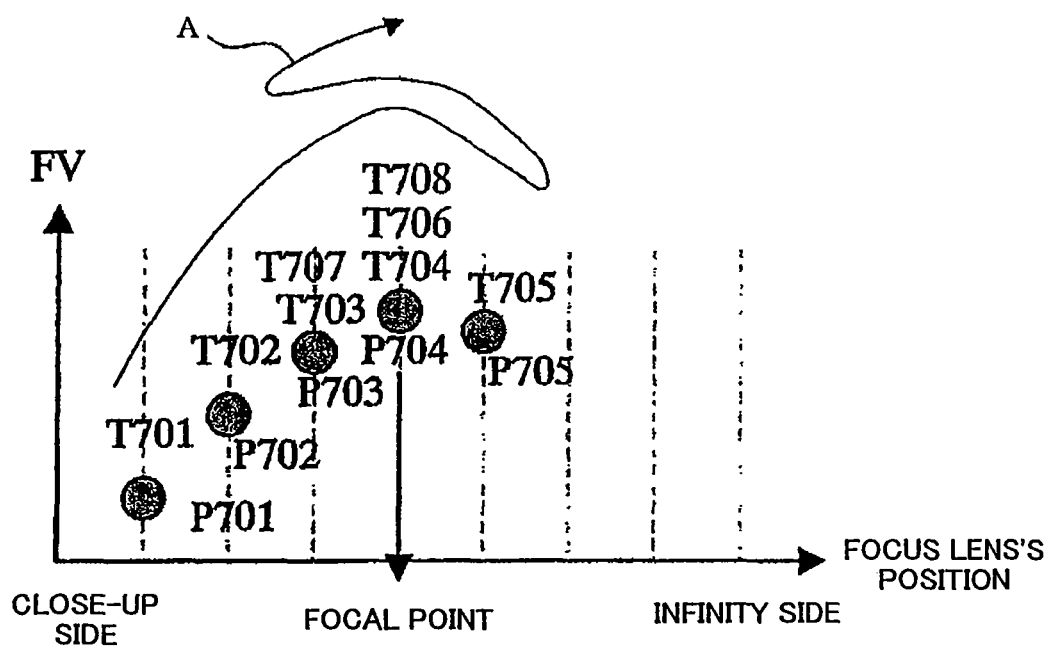
FIG. 7 shows a transition during the process according to the second embodiment of the present invention.

FIG. 7 shows a transition in the normal contrast-detecting AF, where an ordinate axis denotes a level of the AF evaluation value FV, and an abscissa axis denotes a position of the focus lens 131. The right direction of the lens position denotes the infinity side, and the left direction denotes the close-up side. P701 to P705 show a relationship that varies with time between the focus lens position and the AF evaluation value FV.

At first, the focus lens 131 is located at a lens position P701 at time T701, and driven by a predetermined fine amount in a direction for increasing the AF evaluation value FV so as to search for a peak position of the AF evaluation value FV. The motor driving direction is inverted when the AF evaluation value FV starts decreasing (at time T705), and the focus lens 131 is driven in a driving direction (from the infinity side to the close-up side in FIG. 7) for increasing the AF evaluation value FV.

When the AF evaluation value FV decreases at time T707, the focus lens 131 is again driven in the direction (from the close-up side to the infinity side in FIG. 7) for increasing the AF evaluation value. The motor driving direction is inverted when the AF evaluation value FV starts decreasing, and the focus lens 131 is driven in a driving direction for increasing the AF evaluation value FV. Consequently, the focus lens is finally moved to the lens position P704 (focal position) and stops at time T708 tracing a focal-position searching path like an arrow A as shown in FIG. 7.

Figure 5:
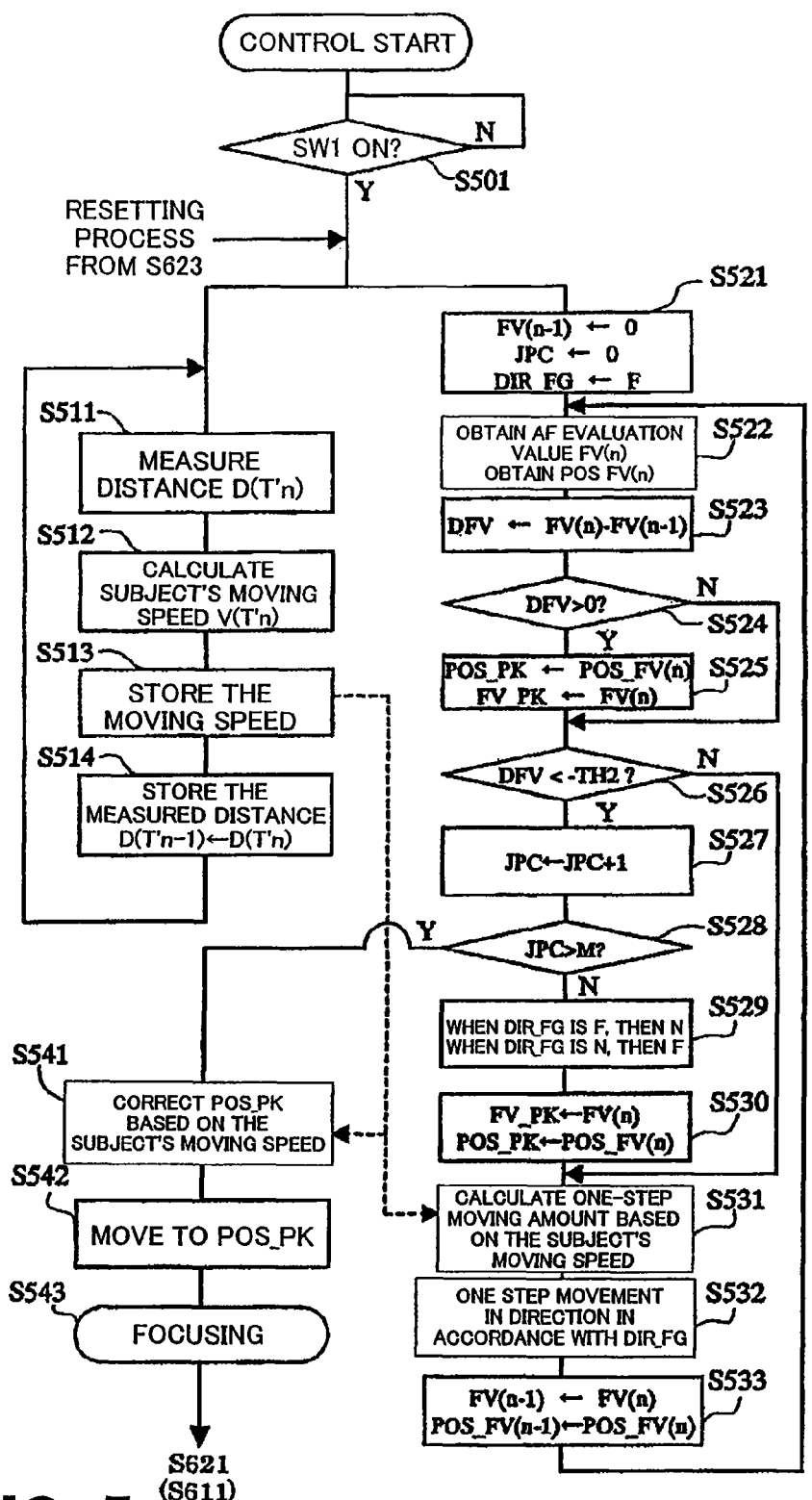
FIG. 5 shows a process flow according to a second embodiment of the present invention.

Referring now to FIGS. 5 and 8, a description will now be given of focus control processing action of this embodiment. FIG. 5 is a flowchart showing the focus control of this embodiment, and FIG. 8 shows a control transition.

First, step 501 detects whether the release switch SW1 turns on, and when the first stroke switch SW1 turns on, the focus control process starts. Similar to the first embodiment, the distance-measuring unit 130 repeatedly detects the subject's moving speed from step 511 to step 514 in parallel to the focus detecting action by the contrast AF process.

Step 511 provides a distance-measuring process and obtains the distance signal D(T'n) at time T'n. The subject's moving speed V(T'n) is calculated from the obtained distance signal D (S512) using an equation V(T'n)=(D(T'n)−D(T'n−1))/(T'n−T'n−1), and stored in the RAM 154 (S513). Step S514 substitutes D(T'n) for D(T'n−1)) to calculate the subject's moving speed next time, and the flow repeats steps 511 to 514.

The contrast-detecting AF coincides with a detection of the subject's moving speed. FV(n) is an AF evaluation value at time T'n, and JPC is the number of inverse driving processes (in the motor driving direction) until the focus state is obtained and is a parameter that indicates the number of times, such as M times. A motor driving direction flag is a parameter that changes a driving direction of the focus lens 131. The flag of N means backward driving, and the flag of F means forward driving.

First, step 521 initializes each parameter. The AF evaluation value FV(n) output from the AF signal controller 134 at each time, and the lens position POS FV(n) corresponding to the AF evaluation value FV(n) are stored in the RAM 154 (S522).

Next, a difference of the AF evaluation value, i.e., DVF=FV(n)−FV(n−1), is calculated, an increasing/decreasing detection of the AF evaluation value FV is detected (S523), and whether the difference DFV is greater than 0 is determined (S524). When the difference DFV is greater than 0 or the focus lens 131 is driven in a direction for increasing the AF evaluation value FV, the AF evaluation value FV(n) and the leans position POS_PK corresponding to the AF evaluation value FV(n) are stored in the RAM 154 (S525). On the other hand, when the difference DFV is smaller than 0 or the focus lens 131 is determined driven in a direction for decreasing the AF evaluation value FV, the flow moves to step 526 without storing the AF evaluation value FV(n) and the leans position POS_PK in the RAM 154 (S525).

The difference DFV is compared with the predetermined threshold TH2. When the difference DFV is greater than the threshold TH2, the flow moves to step 531. When the difference DFV is smaller than TH2, the lens position is determined located near the peak position of the AF evaluation value FV, and the parameter JPC is incremented by 1 (S527). Simultaneously, the motor driving direction flag is changed (S529), and the AF evaluation value FV(n) and the lens position POS FV(n) corresponding to the AF evaluation value FV(n) are stored in the RAM 154 (S530).

Step 529 for changing the motor driving direction flag in step 529 directs a change of the motor driving direction by setting F when the set flag is N, or by setting N when the set flag is F. The contrast detecting system in FIG. 7 corresponds to the procedure from step 521 to step 530.

This embodiment corrects the AF evaluation value FV(n) detected in step 531 based on the subject's moving speed V(n) at time Tn stored in step 513.

Figure 8A:
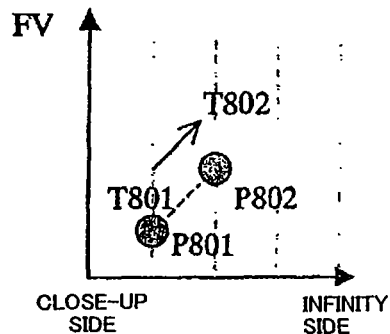
FIG. 8 shows the transition during the process according to the second embodiment of the present invention.
Figure 8B:
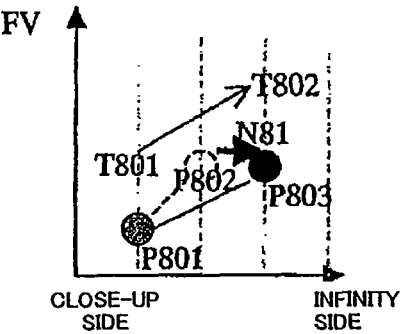
Figure 8C:
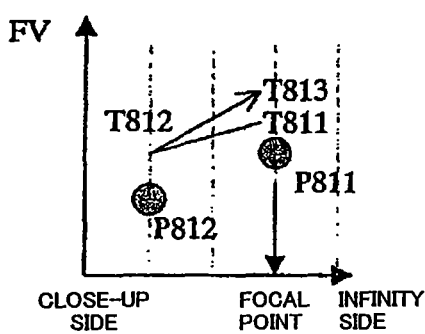

More specifically, when the subject does not move (FIG. 8A), a lens position P801 at time T801 moves to a lens position P802 at time T802. When the subject having the same contrast moves, the destination is determined so that it moves to a lens position P803 at time T802 rather than the lens position at T801 to the lens position P802 at time T802 as shown in FIG. 8B. Since it is determined that the subject moves by a moving amount N81 when converted into the lens position based on an subject's average moving speed between time T801 and time T802, which is detected by the distance-measuring process, the lens position P803 is determined by adding the moving amount N81 to the lens moving amount.

This correction process corresponds to the procedure from step 531 to step 533 in FIG. 5. Step 531 calculates the subject's moving amount using the subject's moving speed, and moves the focus lens 131 to a lens position that is the current lens position added to the subject's moving amount calculated in step 532. In this case, the focus lens 131 is moved in the motor driving direction changed in step 529. The corrected lens position is stored in the RAM 154, and the flow returns to step 522 and the AV evaluation value FV is detected next time T803. The procedure from step 522 to step 533 repeats, and the focus lens 131 approaches to the focal point.

At this time, the contrast-detecting AF process when the subject does not move controls the focus lens 131 at regular intervals (for driving the focus lens 131) and at predetermined driving speed (see FIG. 7). This embodiment thus corrects the AF evaluation value FV (lens position) for the subject's moving amount. Therefore, in the next contrast-detecting AF for driving the focus lens 131 until method, e.g., from the corrected lens position P802 at time T802 to the lens position at time T803, the CPU 151 calculates the next driving interval and speed of the focus lens 131 in accordance with the corrected AF evaluation value FV, providing optimal and quick focus control.

When the subject does not move near the focal point (FIG. 8C), the focus lens 131 is moved from a lens position P811 at time T811 to a lens position P812 at time T812, and returned to the lens position P811 at time T812 (by inversely driving the motor) and moved to the lens position P811 at time T813 for focusing.

Figure 8D:
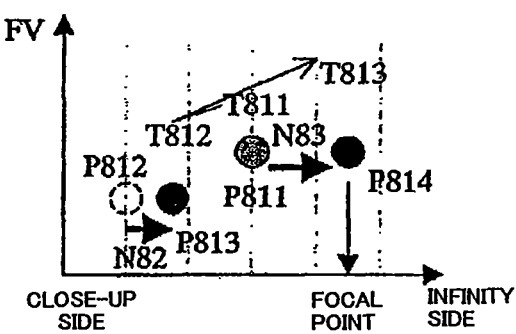

On the other hand, when the subject moves, as shown in FIG. 8D, while the focus lens 131 is moved from the lens position P811 at time T811 to the lens position P812 at time T812, a moving amount N82 is added to the lens position P812 and the focus lens 131 is moved to the lens position P813. Since the subject moves at time T813, the focus lens 131 is moved to the lens position P814 by adding a moving amount N83 to the lens position P811 for focusing. The moving amount N82 corresponds to the subject's moving amount that is calculated by multiplying the subject's average moving speed between time T811 and T812 by a time period (T812−T811), and converted into the lens moving amount. Likewise, the moving amount N83 corresponds to the subject's moving amount that is calculated by multiplying the subject's average moving speed between time T812 and T813 by a time period (T813−T812), and converted into the lens moving amount.

Thereafter, when the number of inverse rotation processes in the motor driving direction in step 528 in FIG. 5 exceeds the predetermined number N, the focus lens 131 is determined located at the focal point, and the flow moves to step 541 that corrects the focal point.

Step 541 corrects a position of the lens position POS_PK based on the subject's moving speed stored in step 513 and a time difference between the current time and the time at which the POS_PK data is detected. S542 moves the focus lens 131 to corrected POS_PK for focusing.

Figure 6:
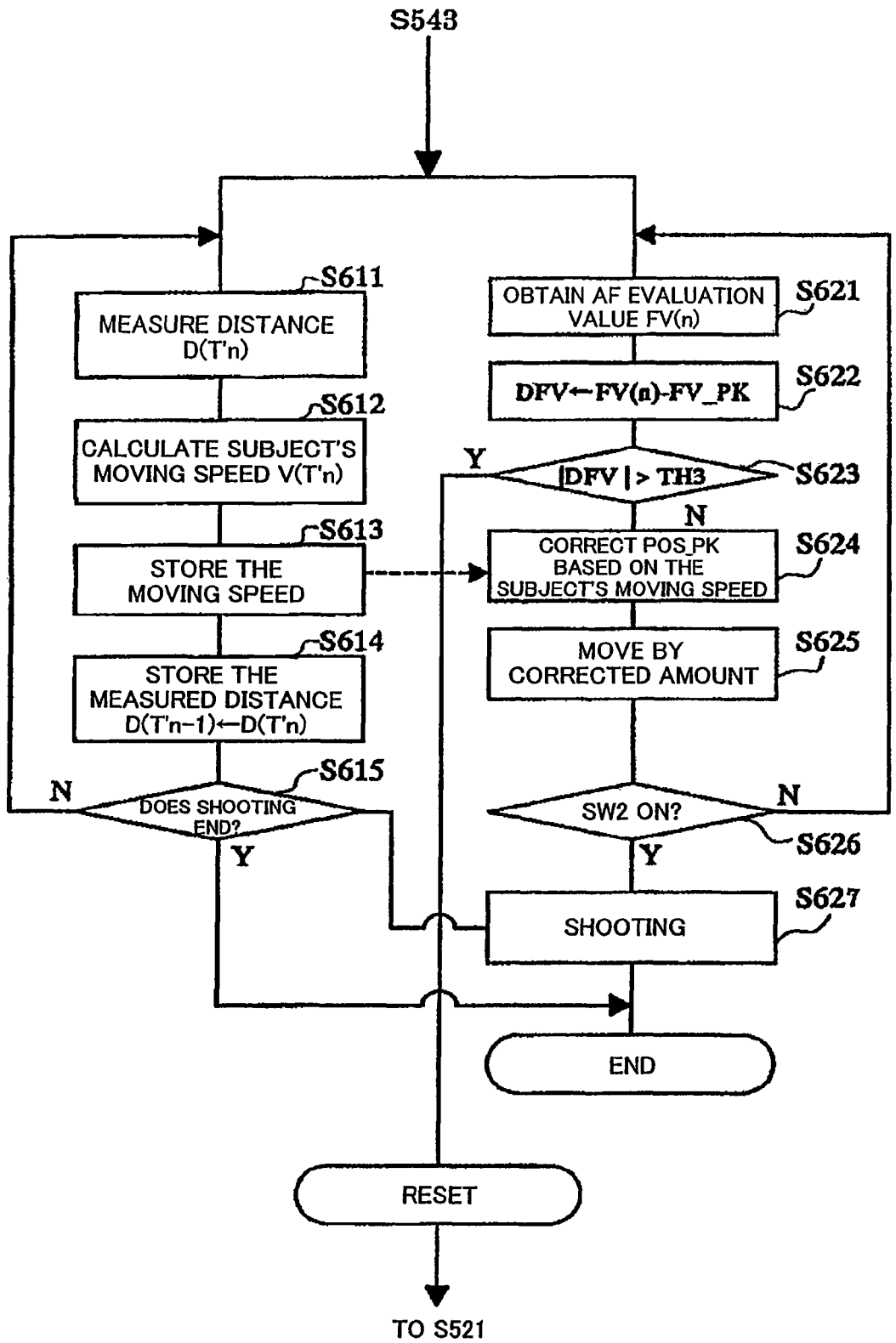
FIG. 6 shows a process flow according to a second embodiment of the present invention.

The procedure shifts to a process that resumes the focal-point detecting operation from the focus state shown in FIG. 6.

The subject's speed detected by the distance-measuring detection from step 611 to step 614 is similar to the procedure from step 511 to step 514 in FIG. 5. The distance-measuring detection process coincides with the reset determination operation from S621 to S625.

First, a current AF evaluation value FV(n) is obtained (S621), and a difference DFV=FV(n)−FV_PK is calculated so as to detect a difference from the focal point of step 543 in FIG. 5.

Then, it is determined whether an absolute value of the difference DFV is greater than a predetermined threshold TH3. When the difference DFV is smaller than the threshold TH3 (or the subject moves slowly), the subject's moving amount is calculated based on the subject's moving speed obtained from step 613 and a position of POS_PK of an apparent focal point is corrected (S624).

Figure 8E:
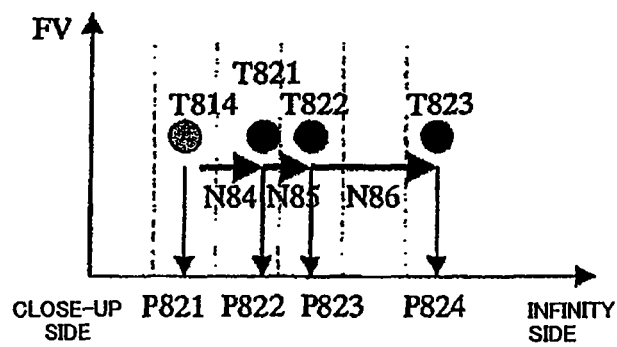

More specifically, even when the focus lens 131 is focused at a lens position P814 at time T821 as shown in FIG. 8E, the focus lens 131 is moved to a lens position P821 at time 822 when the subject moves, which is produced by adding the subject's moving amount to a converted moving amount N84 that is converted into the lens moving amount. The focus lens 131 is moved to a lens position P822 at time T823 by adding the moving amount N85. Thus, the focal point is continuously corrected. The moving amount N84 is produced by multiplying the subject's average moving speed between time T822 and time T821 by a time period (T822−T821) and converting the subject moving amount into the lens moving amount, and N85 and N86 also calculate the subject's moving amount that is converted into the lens moving amount.

The focus lens 131 is moved by the moving amount corrected in step 624 (S625), and the procedure repeats until the second stroke switch SW2 turns on. Thereafter, when the second stroke switch SW2 turns on (S626), the photographing action starts and the procedure ends.

On the other hand, when the average value of the difference DFV is greater than the predetermined threshold TH3 in step 623 (when the subject moves fast), the flow moves to step 521 in FIG. 5 so as to resume the contrast-detecting AF process in FIG. 5.

Figure 9B:
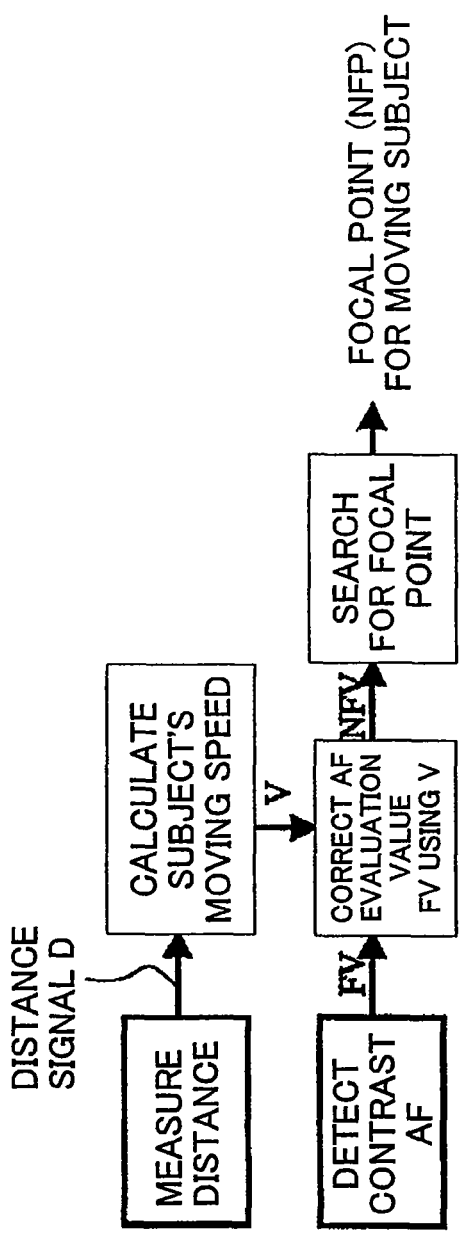

Thus, this embodiment is based on the contrast AF as shown in FIG. 9B, and the distance-measuring AF detecting unit 130 repeats a detection of a distance to the subject and a calculation of the subject's moving speed while the contrast detecting system searches for the focal point. The AF evaluation value FV outputted from the AF signal processor 134 is corrected based on the moving speed V so as to determine the next step width and moving speed for the contrast detection.

Thus, in addition to the operations and effects of the first embodiment, a prediction of subject's movements based on the detections of its movements corrects the previously detected positions of the AF evaluation value, and determines the next step width and moving speed for the contrast detection, realizing the contrast detecting AF that quickly follows the moving subject.

While this embodiment corrects the AF evaluation value (signal) using the subject's moving speed and the contrast detection system, an alternative embodiment switches to the contrast detection system for more precise focusing, after the focus is detected near the focal point in the full scanning system of the first embodiment. In other words, the contrast detection system that detects the subject's moving speed and the full scanning system may be combined with each other if necessary, or may provide independent processing.

In addition, the present invention is applicable to the hybrid AF control. For example, the distance-measuring system governs focusing, and the contrast AF control of this embodiment may follow at a proper timing for quicker and more precise focus control.

As discussed, the first and second embodiments use highly accurate contrast AF control for controlling focus driving based on the detected subject's moving speed, and provide an optical apparatus that provides accurate focus control in accordance with the subject's moving speed.

Third Embodiment

Figure 10:
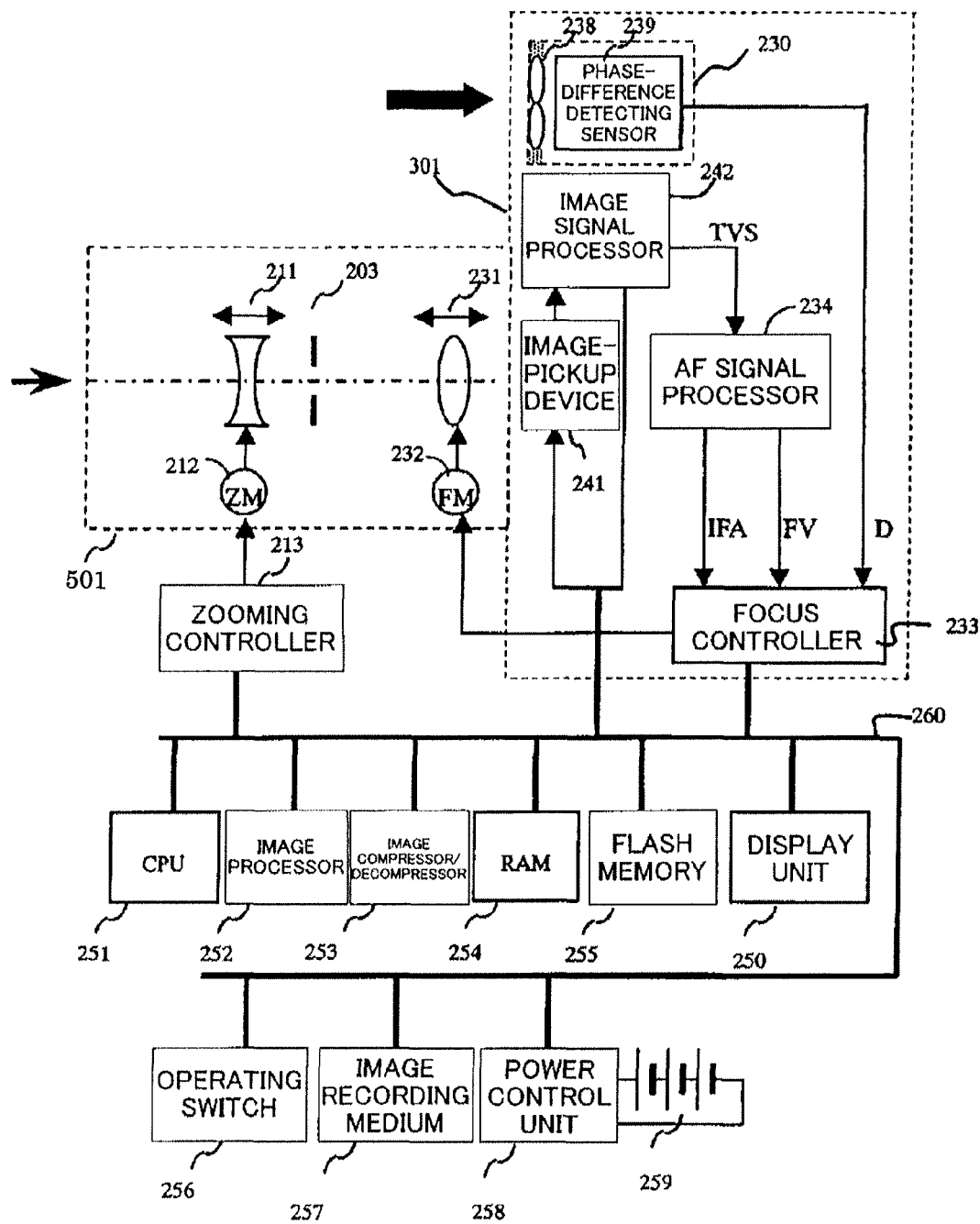
FIG. 10 is a structural block diagram of an image-taking apparatus equipped with a focus control apparatus according to a third embodiment of the present invention.

FIG. 10 is a structural block diagram of a lens interchangeable camera system equipped with a focus control apparatus according to a third embodiment of the present invention.

The image-taking apparatus of this embodiment includes a camera body 301 and a lens unit 501 mounted on the camera body 301. While this embodiment shows a lens interchangeable camera system in which the lens unit 501 is attached to and detached from the camera body 301, the present invention is also applicable to a lens fixed camera system. While this embodiment discusses a digital still camera system, the present invention is also applicable a video camera system. Each of the camera system, camera body and interchangeable lens are included in the inventive optical apparatus.

The lens unit 501 includes a zoom lens 311 that moves in an optical-axis direction and varies a focal length of a projection optical system, a focus lens 231 that moves in the optical-axis direction for focusing, and a light intensity adjusting member (or a stop) 203 that adjusts the incident light intensity upon the image surface in accordance with the brightness of the subject. Each lens includes plural members although they are not illustrated, and the image-taking optical system may include a fixed lens, etc. The zoom lens 211 is driven by a zoom motor 212 via a zoom controller 213, and the focus lens 231 is driven by the focus motor 232 via the focus controller 233.

In the camera body 301, 241 is an image-pickup device, such as a CCD sensor and a CMOS sensor, and the image-pickup device 241 photoelectrically converts a subject image formed by the image-taking optical system. An image signal processor 242 generates an image signal (or shot image signal) TVS based on an output signal from the image-pickup device 241. The image signal TVS is input into the AF signal processor 134 that serves as first and second signal processors. The AF signal processor 234 generates and outputs to a focus controller 233 a FV signal (AF evaluation value signal) as a first signal for the contrast-detecting AF control, and an IFA signal as a second signal that represents the focusing performance.

On the other hand, the outer-measuring type of distance-measuring unit 230 detects a phase-difference amount of a pair of subject images (two images) formed on a phase-difference detecting sensor 239 through a distance-measuring pupil dividing optical system 238, and calculates a distance signal D to the subject using the triangulation and inputs it into the focus controller 233. The focus controller 233 drives the focus lens 231 via the focus motor 232 and executes the AF control based on the distance signal D, the AF evaluation value signal (referred to as an "AF evaluation value" hereinafter) FV, and a focusing performance signal (referred to as an "focusing performance" hereinafter).

The operational principle of the distance-measuring unit 230 of this embodiment is the same as that described for the first embodiment with reference to FIG. 4.

A distance L to the subject calculated by the distance-measuring unit 230 is input as the distance signal D into the focus controller 233.

The image signal output from the image signal processor is temporarily stored in the RAM 254. The image signal stored in the RAM 254 is compressed in an image compressor/decompressor 253, and stored in an image recording medium 257.

In parallel to the compression and recording, the image signal stored in the RAM 254 is turned into an optimal size through a reduction/enlargement process in an image processor 252, and displayed on a display unit 250, thereby allowing a photographer to observe the subject image on a real-time basis. Just after shooting, the display unit 250 displays the shot image for a predetermined time period so as to enable the photographer to confirm it.

An operating switch 156 includes plural switches, such as a power switch, a zoom switch, a release switch, and a display unit (monitor display) on/off switch. The power switch powers on and off the image-taking apparatus, and the zoom switch directs zooming. The release switch allows for two stroke operations, i.e., a half-press operation and a full-press operation. When the first stroke switch SW1 turns on, the reset action from the photography standby and photography preparation action, such as an AF and photometry, start. When the second stroke switch SW2 turns on, the photography action starts while directing the image recording medium 257 to record the image, etc. The monitor display on/off switch switches a mode between a display state and a non-display state of an image on the display unit 250.

The power control unit 258 provides power control, such as a status check of a battery 259 connected to it and charge of the battery.

Prior to these operations, when the camera body 201 is powered on (or switched from the OFF state to the ON state) and activated, a program stored in the flash memory 255 is partially loaded in the RAM 154 and the CPU 251 operates in accordance with the program loaded in the RAM 154.

Each unit and circuit in the image-taking apparatus is connected to each other via a bus 260, and the CPU 251 controls each circuit and unit.

Figure 11:
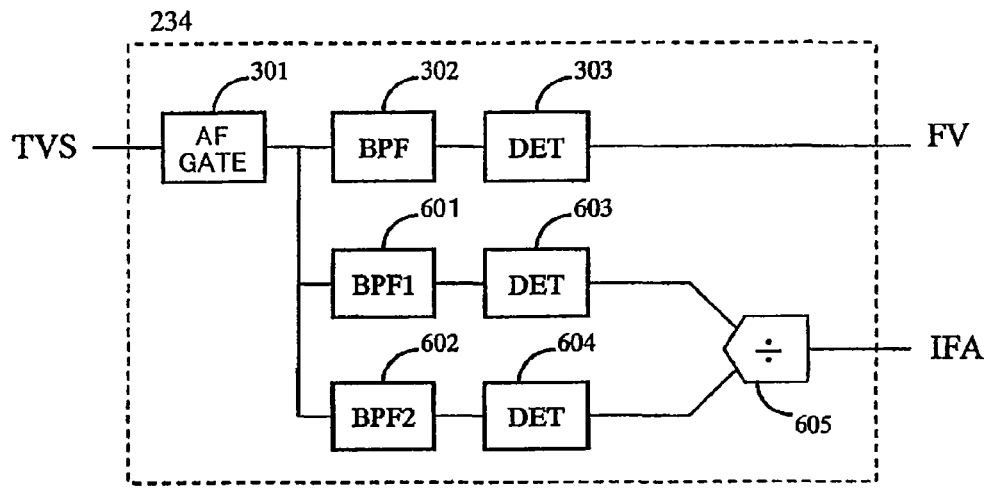
FIG. 11 is a circuit block diagram of the focus control apparatus according to the third embodiment of the present invention.

FIG. 11 is a detailed explanatory view of the AF signal processor 234. One or more AF gates 301 extracts only part of the image signal TVS from the image signal processor 242 within the screen, a band-pass filter ("BPF") 302 extracts only a predetermined high-frequency component, and a detector ("DET") 303 conducts a process, such as a peak hold and integration, generating and outputting to the focus controller 233 an AF evaluation value signal FV.

A band-pass filter (BPF1) 601 and a band-pass filter (BPF2) extract a predetermined high-frequency component out of the image signal TVS that passes the AF gate 301, the detectors 603 and 604 conduct a process, such as a peak hold and integration, and a divider 605 calculates BPF1/BPF2 or a ratio between plural different frequency components in the image signal, calculating the focusing performance IFA for each focal-point detecting area. A characteristic is selected such that the extracted frequency from BPF1 is higher than the extracted frequency from BPF2. When there are plural AF gates 301, the number of following circuits is also plural, plural AF evaluation value signals FV and focusing performance IFA become plural signals. In this case, the focus controller 233 provides focus control by selecting one of the plural signals in accordance with one condition, or based on plural signals.

Thus, from the image signal TVS that passes the AF gate 301, the AF signal processor 234 generates not only the AF evaluation value FP as a first signal using the band-pass filter 302 and the detector 303 as a first signal generator, but also the focusing performance IFA using the band-pass filters 601 and 602, detectors 603 and 604, and divider 605 as a second signal generator.

Figure 12:
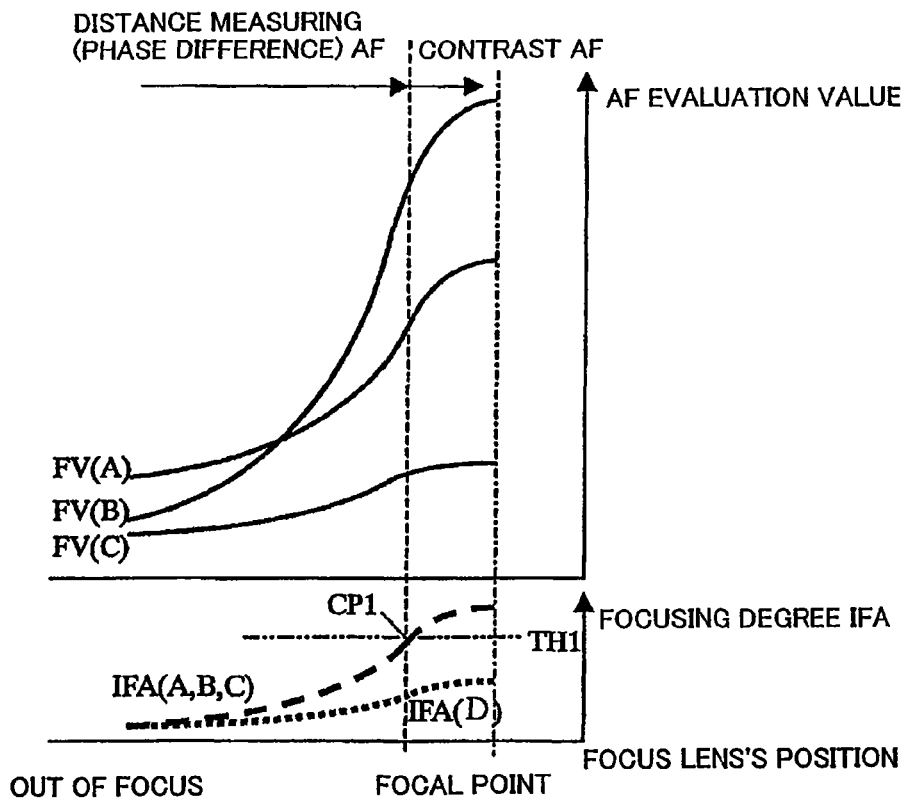
FIG. 12 is an operation explanatory view of the focus control apparatus according to the third embodiment of the present invention.

As shown in FIG. 12, the AF evaluation value FV greatly changes a value at the focal point due to the subject type and photographing condition, such as the brightness of the subject, the light intensity, and focal length. An AF evaluation value FV(A) in FIG. 12 indicates signal changes when the focus lens 231 moves from a blurred defocus point to the focal point in photographing a general subject A. On the other hand, an AF evaluation value FV(B) indicates signal changes for a high-contrast subject B. An AF evaluation value FV(C) indicates signal changes for a low-contrast subject or low-light-intensity subject C.

The focusing performances IFA at the focal points are approximately the same for each of the subjects A, B and C. Therefore, each of the subjects A, B and C has approximately the same defocus state at a point C that intersects with the threshold TH1, and a switch from the distance-measuring AF system to the contrast AF system at a lens position or point CP1 associates with a similar defocus state.

On the other hand, the level of the focusing performance IFA at the focal point reduces for an extremely low-contrast subject and an extremely low-light-intensity subject D. In this case, the focus control by the contrast AF control system becomes difficult, and only the distance-measuring AF detection system detects a focal point and executes focusing.

Figure 13:
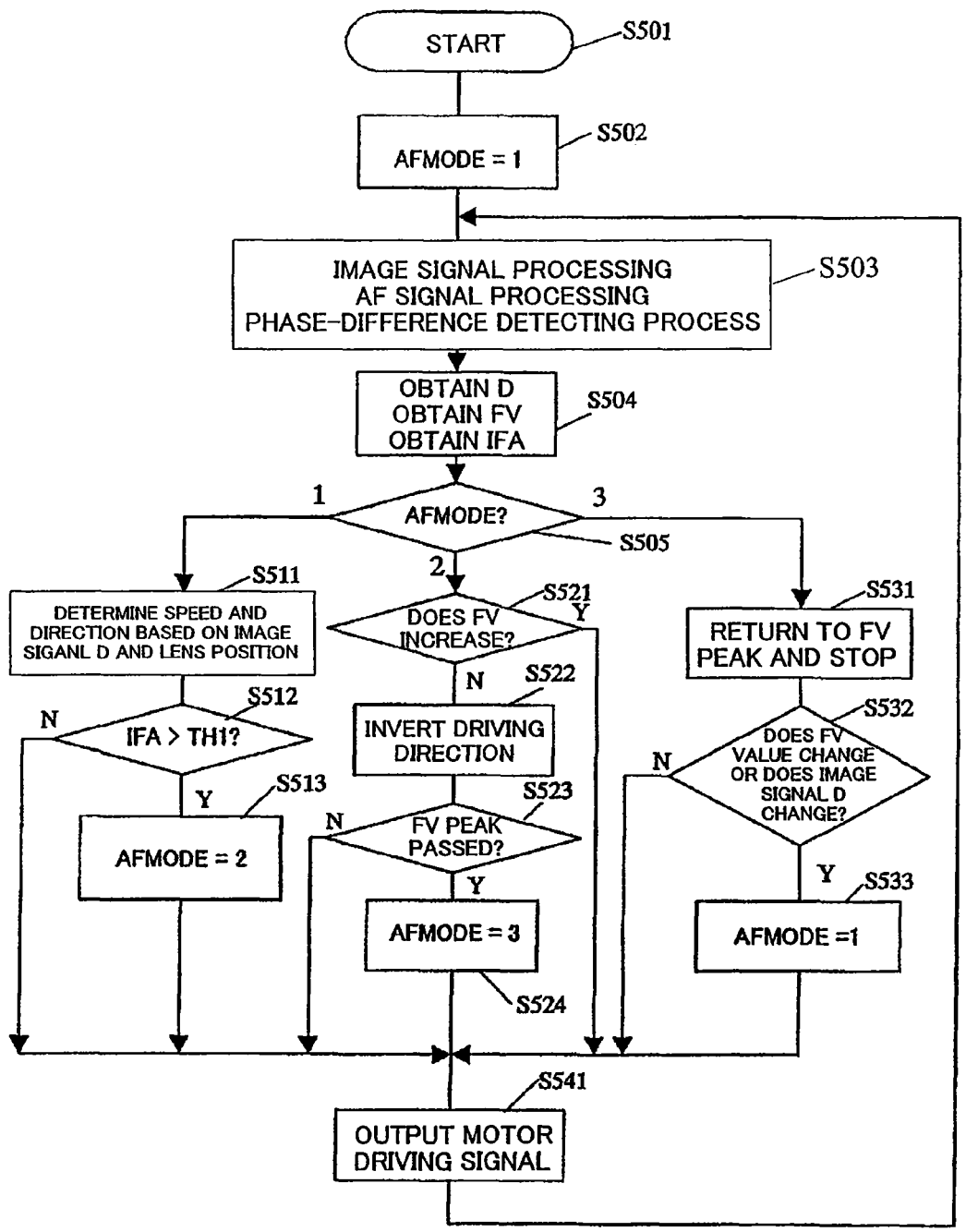
FIG. 13 is a process flow of the focus control apparatus according to the third embodiment of the present invention.

Referring now to FIG. 13, a description will be given of the procedure by the focus control apparatus.

The procedure starts with S501, and S502 sets 1 to AFMODE that indicates an AF control state (or system). S503 synchronously processes an image signal using the image signal processor 242, processes an AF signal using an AF signal processor 234, and detects a phase difference using the phase-difference detecting sensor 239.

S504 obtains a signal of the AF evaluation value FV and a signal of the focusing performance IFA from the AF signal processor 234, and the distance signal D from the phase-difference detecting sensor 239. S505 branches into S511, S521, and S531 in accordance with AFMODE. Since AFMODE is initially 1 (meaning the distance-measuring AF system), the flow moves to S511. S511 determines a lens driving direction and speed based on the current position of the focus lens 231 so that the lens approaches to the position of the distance signal D quickly for a long distance or slowly for a short distance.

When the distance signal D accords with the current lens position, the lens driving speed is set to 0 or the lens is determined to stop. S512 compares the level of the focusing performance IFA obtained at S504 with the threshold TH1. When the level of the focusing performance IFA is smaller than the threshold TH1, the flow moves to S541, and when it is greater, the flow moves to S541 after S513 sets 2 to AFMODE since the lens is close to the focal point. S541 drives the lens at a predetermined motor speed and direction, and the flow moves to S503. Thereafter, the procedure repeats in synchronization with a readout period of the image-pickup device 241 (or image signal processing period).

Next, S505 moves to S521 when AFMODE is 2. S521 determines whether the AF evaluation value FV obtained at S504 increases or decreases. Since S521 compares the previous readout result from the image-pickup device 241, the previous AF evaluation value FV is held although FIG. 13 does not describe so. When S521 determines that the AF evaluation value FV increases, the flow moves to S541, and when S521 determines that it decreases the flow moves to S522. S522 inverts the lens driving direction, and S523 determines whether the decrease is as a result of passing the peak (or maximum value) of the AF evaluation value FV.

When S523 determines that it has not yet passed the peak, then the flow moves to S541, and when S523 determines that it has passed the peak, the flow moves to S524. S524 sets 3 to AFMODE. When S505 determines that AFMODE is 3, the flow moves to S531 that stops the lens at the peak position of the AF evaluation value FV, i.e., at the focal point. S532 monitors whether the AF evaluation value FV changes at the peak position of the AF evaluation value FV (or the maximum value of the AF evaluation value changes), and monitors whether the distance signal D changes at the focal point. When it does not change, the flow moves to S541. When it changes, S533 sets 1 to AFMODE, and the flow moves to S541 (resuming the distance-measuring AF).

Thus, this embodiment detects the focusing performance IFA based on the image signal TVS, and switches from the outer distance-measuring AF system to the contrast AF system based on the focusing performance IFA.

In particular, use of the focusing performance corresponding to a ratio between plural different frequency components in the image signal for a switching point of the AF system switches the AF control from the distance-measuring AF system to the contrast AF system, with the similar defocus state.

Thus, this configuration switches a mode at a proper switching point between two AF systems, and precisely detects the focal point, realizing a focus control apparatus and an optical apparatus, which provide smooth and quick focus control.

In addition, detection by the distance-measuring AF system in synchronization with the readout timing of the image-pickup device 241 properly fixes the timing with the contrast AF system, timely switches the AF system and provides smooth and quick focus control.

Fourth Embodiment

Figure 14:
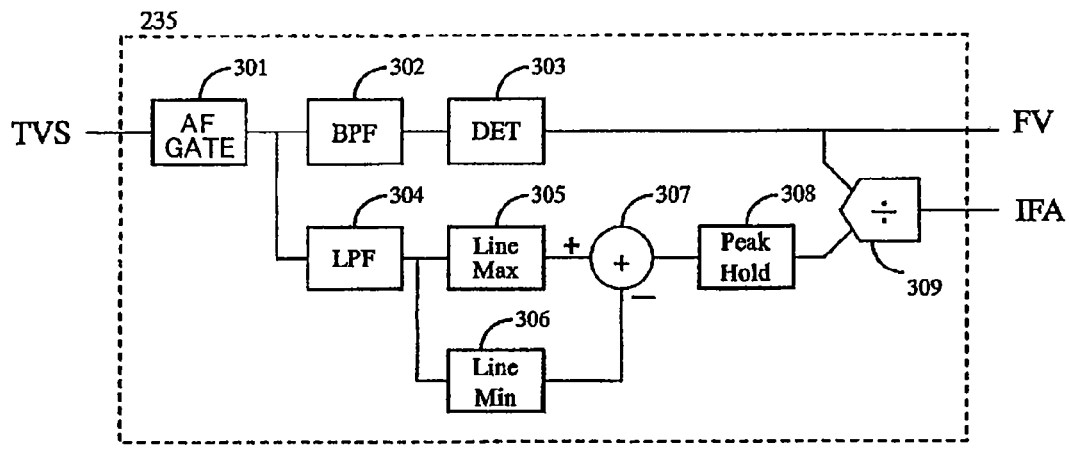
FIG. 14 is a circuit block diagram of the focus control apparatus according to a fourth embodiment of the present invention.

FIG. 14 shows a detailed structure of the AF signal processor 234 in a camera system according to a fourth embodiment of the present invention. This embodiment calculates more precise focusing performance IFA in the calculation process of the focusing performance in the third embodiment. The camera system of this embodiment has a structure similar to that of the third embodiment, and similar elements are designated by similar reference numerals.

One or more AF gates 301 extract only part of the image signal in a screen, the BPF 302 extracts only a predetermined high-frequency component, and the DET 303 conducts a process, such as a peak hold and integration, generating and outputting to the focus controller 233 an AF evaluation value signal FV, similar to the third embodiment.

On the other hand, the low-pass filter 304 removes a high-frequency component from the image signal TVS that passes the AF gate 301, a line maximum value part (Line Max) 305 detects a maximum value for one horizontal line, and a line minimum value part (Line Min) 306 detects a minimum value for one horizontal line. An adder 307 calculates a difference between the maximum value and the minimum value, i.e., maximum value−minimum value, and a peak holder 308 detects a peak value MM of the difference between the maximum value and the minimum value (i.e., the maximum value−the minimum value). This almost corresponds to the maximum value of the contrast in the AF gate 301.

The divider 309 divides an AF evaluation value FV by a peak value MM for each AF gate 301, and calculates the focusing performance IFA for each distance-measuring frame with precision. When there are plural AF gates 301, there are plural associated circuits and plural signals of AF evaluation value FV and focusing performance IFA. The focus controller 233 executes AF by selecting one of the plural signals in accordance with a condition, or based on the plural signals.

Therefore, from the image signal TVS that passes the AF gate 301, the AF signal processor 235 of this embodiment generates not only the AF evaluation value FP as a first signal using the band-pass filter 302 and detector 303 as a first signal generator, but also the focusing performance IFA using the low-pass filter 304, Line Max 305, Line Min 306, adder 307, peak holder 308, and divider 309 as a second signal generator.

This embodiment calculates a difference between the maximum value and the minimum value for one horizontal line of the image signal TVS, and calculates a value normalized (or divided) AF evaluation value FV as the focusing performance IFA based on the difference (or peak value MM), providing more precise focus control in addition to the effects of the third embodiment.

Fifth Embodiment

Figure 15:
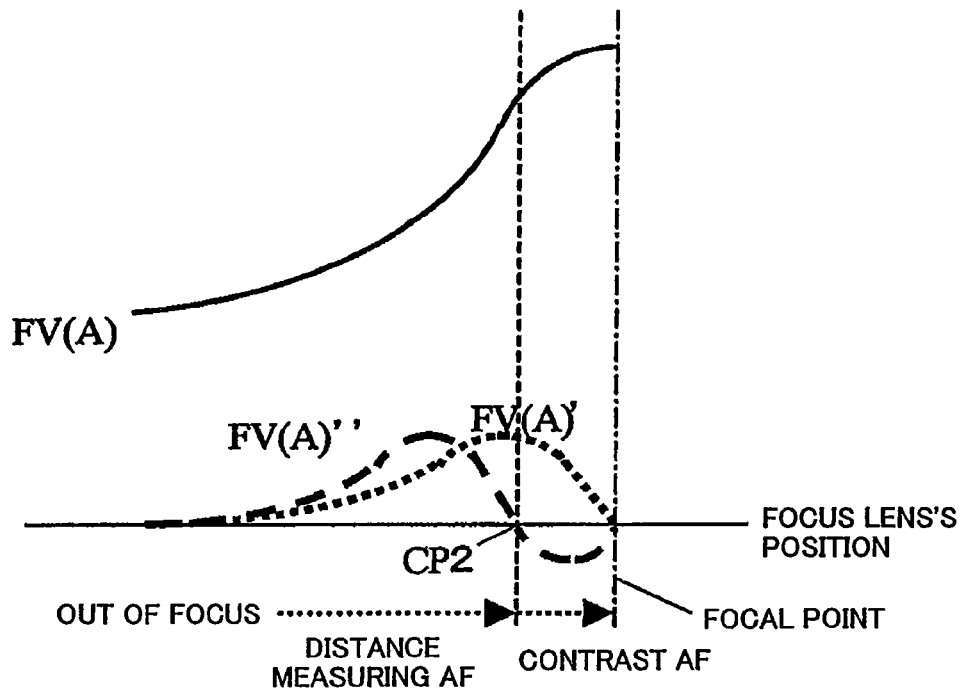
FIG. 15 is an operation explanatory view of the focus control apparatus according to a fifth embodiment of the present invention.
Figure 16:
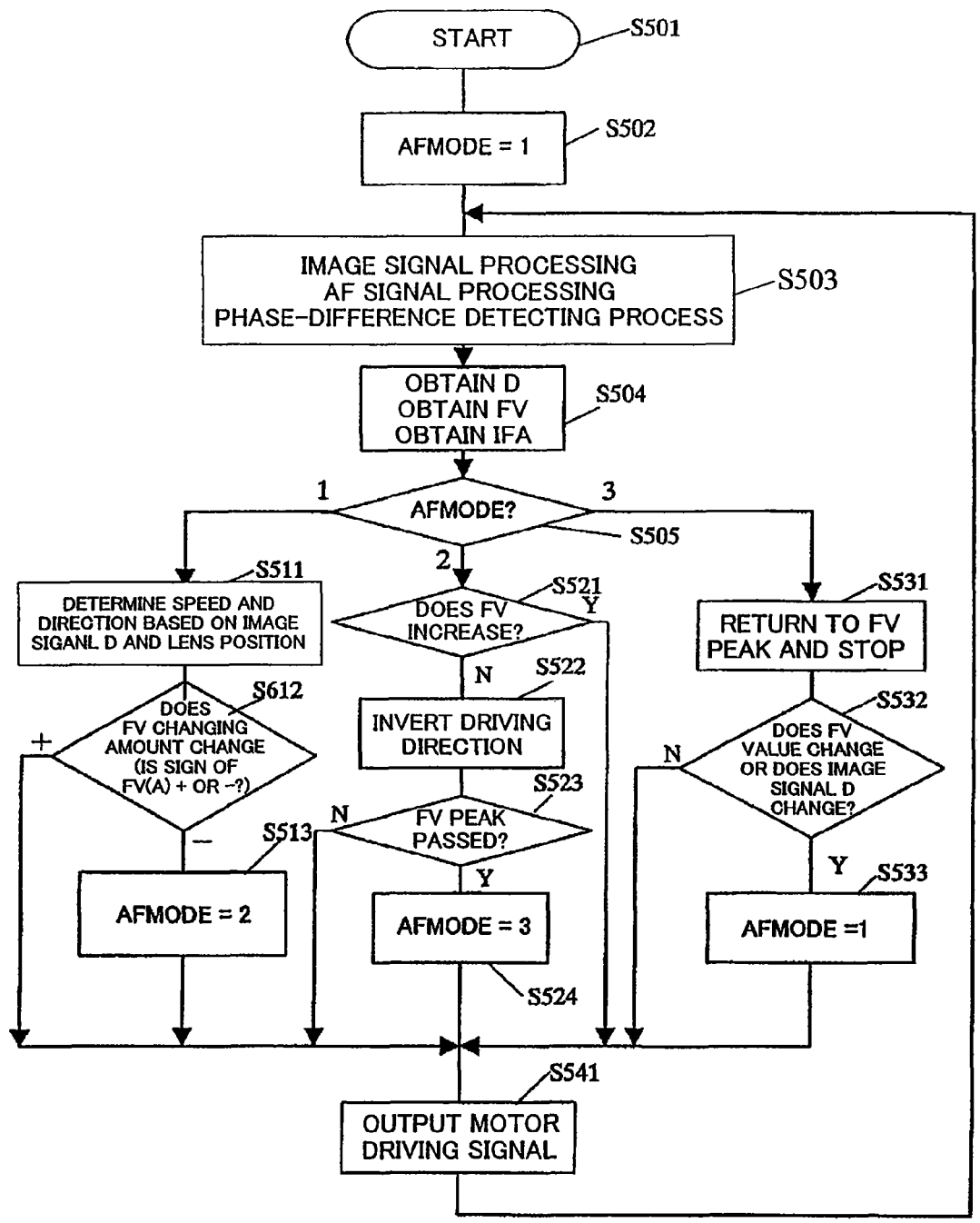
FIG. 16 is a process flow of the focus control apparatus according to the fifth embodiment of the present invention.

FIGS. 15 and 16 show an overview of the AF process in a camera system according to a fifth embodiment of the present invention. This embodiment generates the AF evaluation value FV from the focusing performance IFA described in the third embodiment.

As shown in FIG. 6, the subject A changes by FV(A) from a blurred defocus state to the focal position. This embodiment calculates the focusing performance IFA based on the changing amount of FV(A).

More specifically, the changing amount of FV(A) at the focal point is 0 since it is the peak of the AV evaluation value (or a vertex of FV(A) in FIG. 6). Therefore, differentiated FV(A) or FV(A)' changes so that it is 0 at the focal point.

A differentiation of FV(A)' or a change of the changing amount of F(A) is FV(A)", which is 0 at the intersection CP2 and the focal point. Since the change of the changing amount of F(A) is 0 at the intersection CP2, the distance-measuring AF system is switched to the contrast AF system at the lens position of the point CP2, with the similar defocus state. Thus, the AF control is switched by utilizing a characteristic that FV(A)" is 0 at CP2 so that the outer distance-measuring AF system is used up to the point CP2 and the contrast AF system is used from the point CP2 to the focal point. In other words, the change of the changing amount of the AF evaluation value FV or a sign (+ or −) of FV(A)" is used as the focusing performance IFA.

612 determines the sign of FV(A)" as shown in FIG. 7: When the sign is +, the flow proceeds to S541 for focus control using the outer distance-measuring AF. When the sign is −, the flow proceeds to S513 to switch to the contrast AF and set 2 to AFMODE. Then, the flow moves to S541. The processes of other steps are similar to those of the third embodiment, and a description thereof will be omitted.

Therefore, this embodiment determines a switching point from the outer distance-measuring AF to the contrast AF using a change of the sign (or polarity) of the focusing performance IFA instead of a threshold, and more precisely switches two AF systems. This embodiment simplifies the circuitry, and improves the processing speed of the focus control, as well as the effects of the third embodiment.

While this embodiment discusses the passive distance-measuring AF system, the present invention can adapt the TTL phase-difference detecting system and an infrared AF system that calculates a distance to the subject using the triangulation principle by receiving the infrared light projected upon the subject. In other words, the distance-measuring and phase-difference AF systems are not limited to be combined with the contrast AF system based on the image signal TVS.

As discussed, the third to fifth embodiments switches the hybrid AF control system based on the focusing performance signal generated based on the ratio between plural different frequency components in the image signal, based on plural difference values between the AF evaluation value signal and image signal, and based on the focusing performance signal in accordance with changes of the AF evaluation value signal, realizing the focus control apparatus that provides smooth and quick focus control.

This application claims a benefit of foreign priority based on Japanese Patent Applications Nos. 2004-177183, filed on Jun. 15, 2004 and 2004-188429, filed on Jun. 25, 2004, each of which is hereby incorporated by reference herein in its entirety as if fully set forth herein.

What is claimed is:

1. A focus control apparatus comprising:
   a first signal generator for generating a first signal that corresponds to a predetermined frequency component in an image signal obtained by photoelectrically converting an image of a subject formed by an image-taking optical system;
   a detector for detecting a second signal as a phase-difference signal different from the first signal;
   a controller for providing the image-taking optical system with contrast AF control based on the first signal and phase-difference AF control based on the second signal; and
   a second signal generator for generating a third signal that corresponds to a ratio between plural different frequency components in the image signal,
   wherein said controller selects one of the contrast AF control and the phase-difference AF control based on the third signal.

2. A focus control apparatus according to claim 1, wherein the third signal is a signal indicative of focusing performance of the image signal.

3. A focus control apparatus according to claim 1, wherein said controller provides the contrast AF control when the third signal is greater than a predetermined value, and the phase-difference AF control when the third signal is smaller than the predetermined signal.

4. An optical apparatus comprising:
   an image-pickup unit for photoelectrically converts an image of a subject formed by an image-taking optical system;
   a recording circuit for recording an image signal in a recording medium, which image signal is obtained by using the image-pickup unit; and
   a focus control apparatus according to claim 1.

5. A focus control apparatus comprising:
   a first signal generator for generating a first signal that corresponds to a predetermined frequency component in an image signal obtained by photoelectrically converting an image of a subject formed by an image-taking optical system;
   a detector for detecting a second signal as a phase-difference signal different from the first signal;
   a controller for providing the image-taking optical system with contrast AF control based on the first signal and phase-difference AF control based on the second signal; and
   a second signal generator for generating a third signal by normalizing the first signal,
   wherein said controller selects one of the contrast AF control and the phase-difference AF control based on the third signal.

* * * * *